United States Patent [19]
Thomas

[11] 3,787,842
[45] Jan. 22, 1974

[54] COHERENT OPTICAL RADAR PROCESSOR

[75] Inventor: Carlton E. Thomas, Van Nuys, Calif.

[73] Assignee: KMS Industries, Inc., Ann Arbor, Mich.

[22] Filed: May 25, 1970

[21] Appl. No.: 40,265

[52] U.S. Cl.................. 343/5 PC, 343/6 R, 343/7.7
[51] Int. Cl............................................... G01s 9/42
[58] Field of Search.................... 343/5 PC, 6 R, 7.7

[56] References Cited
UNITED STATES PATENTS

| | | | |
|---|---|---|---|
| 3,127,605 | 3/1964 | Alderson | 343/7.7 |
| 3,066,289 | 11/1962 | Elbinger | 343/7.7 |
| 3,127,607 | 3/1964 | Dickey, Jr. | 343/7.7 X |
| 3,110,023 | 11/1963 | Chaffee | 343/7.7 X |

Primary Examiner—Malcolm F. Hubler
Attorney, Agent, or Firm—Barnes, Kisselle, Raisch & Choate

[57] ABSTRACT

A radar processing system and method for extracting from received radar data information about moving targets even though the absolute energy reflected by these targets is much less than the energy reflected by the stationary background. The processing system includes an optical recorder for recording the magnitude of the reflected energy and a coherent optical processor for processing the recorded information by computing the power spectrum of the Doppler frequency shift in the recorded information and thereby distinguishing a true target from the stationary background. In addition, means are provided for eliminating from the recorded information any range ambiguities produced at higher pulse repetition frequencies because, at these higher frequencies, echoes from far ranges return at the same time as echoes generated by later radar pulses return from near ranges. The optical processor can operate on data from airborne or groundbased radars.

13 Claims, 15 Drawing Figures

COHERENT OPTICAL RADAR PROCESSOR

BACKGROUND OF THE INVENTION

1. Field of the Invention

This invention relates to radar processing systems and more particularly to a coherent optical processing system whereby moving targets may be readily distinguished from background clutter.

2. Description of the Prior Art

Since many radars operate with more background noise than target signals, the detection of moving targets in this background noise has been a long standing problem in the radar art. At any instant of time, the electromagnetic energy detected by a radar receiver due to the background may exceed the energy from targets by four or five orders of magnitude. The usual display techniques would not reveal any targets since they would be hidden in the background clutter noise. Some means of post detection processing is thus required to detect targets in the presence of high background clutter.

One common method of such processing discriminates targets from clutter on the basis of target motion, since the target motion causes a Doppler shift in the frequency of the reflected energy, whereby the stationary ground or clutter frequencies are not shifted significantly. A moving target indicator (MTI) or airborne moving target indicator (AMTI) may thus distinguish between moving targets and the stationary background by measuring the Doppler frequency shift of all returned echoes and passing only the shifted frequencies to the output display.

There are two general types of MTI processors employing the Doppler frequency shift principle in operation today; delay line cancellers and pulse doppler processors. A delay line canceller operates on the phase shifts produced by moving targets. If a short radar pulse illuminates a moving target at one instant of time, the reflected energy will have a certain phase relationship relative to the local oscillator of the radar. Fractions of a second later, a second radar pulse illuminates the same target. If the target has moved in this interval, the reflected energy will have a slightly different phase shift from the first echo. Stationary targets, on the other hand, produce exactly the same phase shift, pulse after pulse for a ground based radar. In employing this type processor, the radar electronics compare the phase of the reflected echoes with the phase of a coherent local oscillator. Since the phase of signals reflected from moving targets changes from one pulse to the next, a moving target generates a varying output from the radar electronics whereas successive pulses from a stationary target do not cause such a change. Thus, if alternate pulses are subtracted, the background information is cancelled out. To implement the subtraction of alternate pulses, each pulse may be stored and delayed until the next pulse returns from the target. The delay line stores and delays the radar waveform, and conventional subtraction circuits cancel the stationary background clutter.

While delay line canceller radars are effective for some applications, they are limited in the amount of clutter which they can cancel. Backgrounds which fluctuate with time (trees, seas, rain, etc.) and system instabilities can generate the equivalent of moving clutter and therefore cause false alarms. Moreover, for AMTI radars, the background is always in motion relative to the radar since the radar is moving. Delay line canceller AMTI systems do work to some degree, but they do not provide adequate clutter cancellation over several classes of backgrounds, particularly cities and other man-made structures. A second problem with delay line cancellers is the amount of equipment stability required. The entire radar system must be exceptionally stable to prevent equipment changes from altering the phase or amplitude of the radar signal. Such a degree of stability is difficult to achieve practically; for example, a delay line is normally very sensitive to temperature variations.

A second general type of operational MTI radar is the pulse Doppler radar. In this type radar, the detected radar signal is first separated by a set of range gates, so that data from a given range interval always passes through the same range gate on successive radar pulses. Once the data signals are segregated into range intervals, the signals derived from moving targets fluctuate and are passed by appropriate electrical filters which reject the stationary clutter. Although this type radar achieves improved clutter cancellation, its major difficulty is its complexity, since it requires one range gate for each range resolution element. For many practical applications, radars must have 10,000 or more such range elements. Even with modern micro-circuit technology, the production of 10,000 discrete circuits could be prohibitive. As a result, most practical Doppler radars have been limited to hundreds of range gates or less.

SUMMARY OF THE INVENTION

This invention provides a coherent optical radar processing system whereby information about moving targets may be extracted in the presence of high background clutter. The processing system includes an optical recorder for recording the radar data and an optical processor for processing this stored record in such a way that moving targets are distinguished from the background clutter. The optical recorder includes an electro-optical modulator which modulates a coherent light beam in accordance with the radar echoes received from transmitted radar pulses. This modulated beam is focused upon a photosensitive film which comprises a recording medium. The film is advanced as the modulated beam scans across it in a direction transverse to the direction of its advancing motion. The scanning is synchronized with the transmitted radar pulses so that the echoes from one pulse are recorded on the film in a direction transverse to its advancing motion. The echoes from the next transmitted pulse are then similarly recorded so that the echo waveforms (reflected energy versus range for each pulse) are recorded side-by-side on the film.

The coherent optical processor then operates upon this recorded radar data in such a fashion that moving targets may be distinguished from any background clutter. The record film is advanced through a beam of collimated, coherent light. A lens system then focuses the light beam which has been modulated by the entry of the stored radar data. The lens system is constructed such that the Doppler shift of the radar data recorded in the direction of advancing motion of the record film determines one directional displacement of the image and the radar data recorded in the transverse direction of motion determines the other directional displacement of the image. In an AMTI system, additional means are used to cancel that portion of the image which represents background information; however, this can be easily accomplished since the Doppler shift of a stationary background may be calculated and this portion of the image may then be removed.

Moreover, the system may be adapted to remove range ambiguities resulting from high pulse repetition frequencies since, at these frequencies, echoes from far ranges return at the same time as echoes generated by later pulses returned from near ranges. In this system, the synchronization of the scanning means and the radar pulses is such that the radar data from the minimum radar range always starts at the bottom of the film and the data from the first ambiguous range always falls at the top of the film, where the first ambiguous range is defined as that range whose echo will coincide with the echo from the minimum range when it is illuminated by the next pulse. Furthermore, the time between transmitted radar pulses is altered according to the progression:

$$t, t+\Delta, t+2\Delta, \ldots t+n\Delta,$$

where $t$ is the time between the first and second radar pulse and $n$ is a predetermined number; the progression being repeated once it has been completed. Thus, all the recorded radar data derived from a given range ambiguity falls along a line of a predetermined angle on the film. A multichannel optical processor then processes the stored data, each channel operating along a predetermined angle in a similar fashion as the single channel processor described above.

A general object of the invention is to provide an improved radar processing system for extracting information from radar data about moving targets even though the absolute energy reflected by these targets is much less than the energy reflected by the stationary backgrounds.

Another object of the invention is to provide a radar processing system with a large storage capacity and a high data processing rate.

A further object of the invention is to provide a radar processing system which provides a permanent record of received radar data which can be reprocessed for further analysis.

An additional object of the invention is to provide a coherent optical radar processing system.

Another object of the invention is to provide a radar processing system which has means for resolving range ambiguities produced at higher pulse repetition frequency rates.

DESCRIPTION OF THE PREFERRED EMBODIMENT

The following descriptions relate to an optical processor as applied to an airborne radar. Since the airborne application is technically more difficult than the ground based radar application, the extension to the latter will be obvious to one skilled in the art. Two distinct subsystems are required for the optical processing system; an optical recorder and an optical processor.

The purpose of the recorder is to store the radar data on some substrate so that it may be processed by the optical processor. The data may be stored in a form of intensity variations or phase variations on the film. Two general types of recorders are feasible; a cathode ray recorder and a laser recorder. The laser recorder has the advantage of brighter spot irradiance which allows the use of lower sensitivity films which, in turn, have higher resolution and less spatial noise. Therefore, the following descriptions relate to a laser recorder although a cathode ray tube recorder may also be employed.

Figure 1:
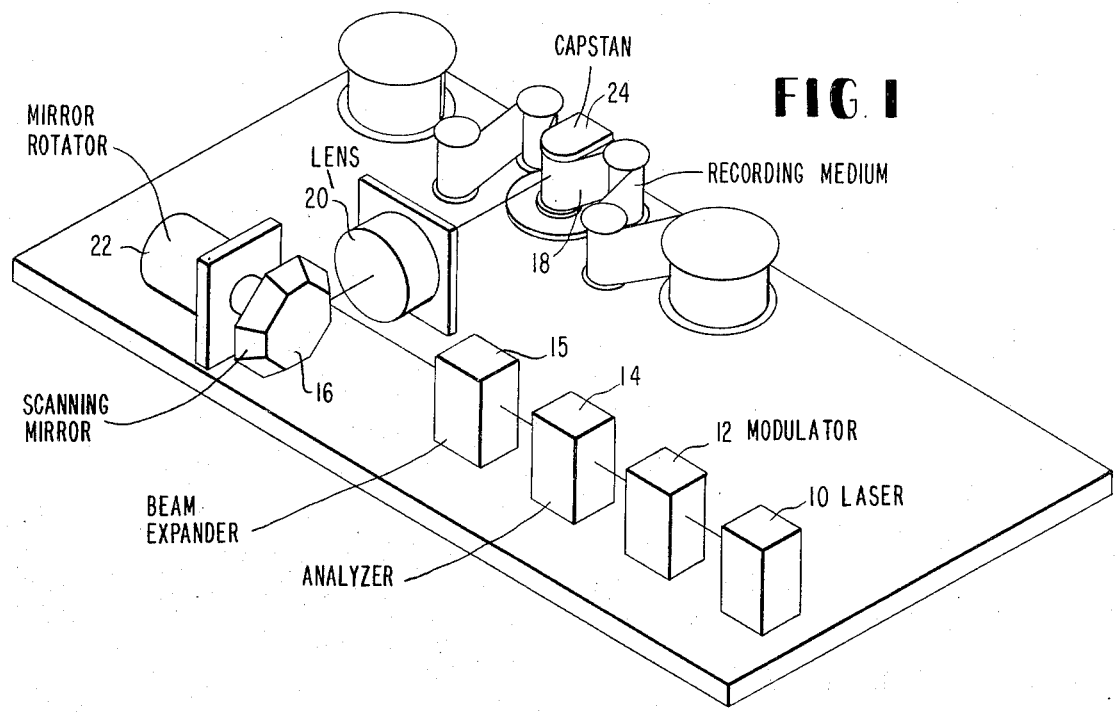
FIG. 1 illustrates an optical recorder employed in the invention.

FIG. 1 is a schematic illustration of an optical recorder. A laser 10 provides a collimated laser beam which enters a light modulator 12. The modulator 12 may be of any conventional design although an electro-optic modulator is preferred. It is coupled to the received radar signal and modulates the polarization of the laser beam in proportion to this received signal. An analyser 14 converts this polarization modulation into intensity modulation. A beam expander 15 comprises a short focal length lens followed by a long focal length lens, with a small pinhole placed at the focus of the first lens, is used to remove spatial noise from the laser beam and thereby increase recording resolution. A rotating mirror 16 comprises a scanning means and scans this modulated light beam rapidly across the width of the recording medium 18, a strip of photosensitive film. The lens 20 focuses the beam onto the film. The rotating mirror 16 is synchronized to the radar in such a manner that the laser beam is at the bottom edge of the film at the instant a radar echo returns from the closest range interval. The mirror rotation rate is controlled by the rotating mirror assembly 22 and for the following descriptions it is assumed that the rotation rate is fixed such that the beam from one mirror facet traverses the width of the film in exactly the time it takes a radar pulse to travel from the nearest range to the farthest range and back. Thus, the echoes received from each radar pulse are recorded in one track on the film.

The film moves uniformly in a direction perpendicular to the scan motion. As a result, successive radar pulses expose parallel lines on the film. A Doppler frequency shift history of each target is therefore built up on the film, scan by scan. The capstan 24 is made to move very uniformly at a velocity proportional to the pulse repetition frequency of the radar.

Several features of this laser recorder should be emphasized. A first is the use of a beveled scanning mirror 16 as illustrated. Conventional scanners normally use polygon mirrors which necessarily limit the proximity of the polygon to the focusing lens. For the present application, the spacing between the scanning mirror and this lens ideally should be zero so as to reduce the required lens aperture size. Thus, with a 45° beveled polygon mirror as illustrated, the mirror can be moved much closer to the lens.

Figure 2:
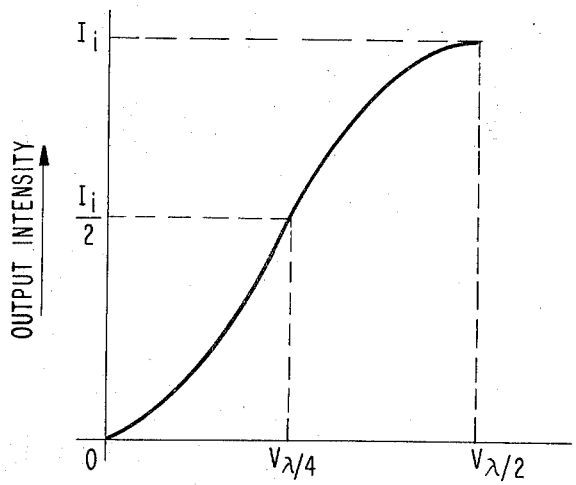
FIG. 2 illustrates a transfer function of an electro-optic modulator.

A second feature relates to the light modulator and is necessary to make the operation of the system practical. A transfer function of a typical electro-optic modulator approximates a cosine curve as illustrated in FIG. 2. This non-linear response cannot be tolerated in an AMTI radar, since the ground clutter would be non-linearly recorded. This would in turn produce harmonics of the ground clutter spectra which, if they fell into the regions of the Doppler frequency band normally occupied only by moving targets, would produce false targets as the harmonics of the clutter would be misinterpreted as moving targets. Furthermore, the light output from a laser is not perfectly uniform and fluctuates with time. This laser noise would be recorded on the film along with the radar information.

Figure 3:
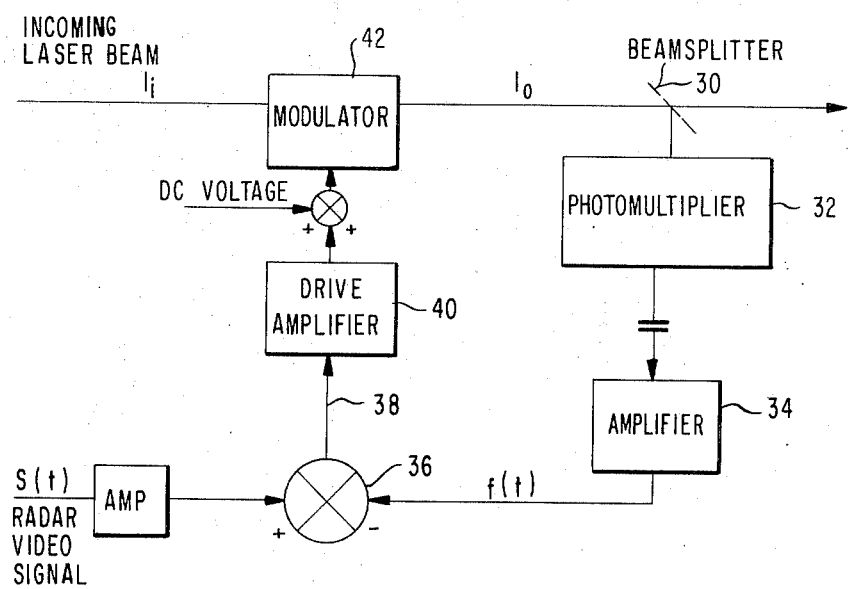
FIG. 3 illustrates a feedback loop employed to linearize the output of an electro-optic light modulator.

Both of these deficiencies can be significantly reduced by employing a feedback loop as illustrated in FIG. 3. The beam splitter 30, the photomultiplier 32, and the amplifier 34 monitor the light fluctuations at the output of the modulator which is compared by the summing node 36 with the desired radar video signal. An error signal representing the difference between these signals is generated on line 38 and then amplified by the drive amplifier 40. This amplified signal is then employed to modulate the light modulator 42. It can be shown by classical feedback theory that the modulator transfer function is partially linearized and the laser noise effectively cancelled by this feedback system.

The third important feature is the mirror synchronization device. As described above, the scanning mirror must be synchronized with the radar pulses so that the echo wave-forms (reflected energy versus range for each pulse) are recorded side-by-side on the recording film. Therefore, the energy from the nearest range for a first pulse must be in parallel on the film with the energy reflected from the same range on all successive pulses. There are two basic approaches to the synchronization of the mirror; a closed-loop slave operation and an open self-synchronous operation.

Figure 4:
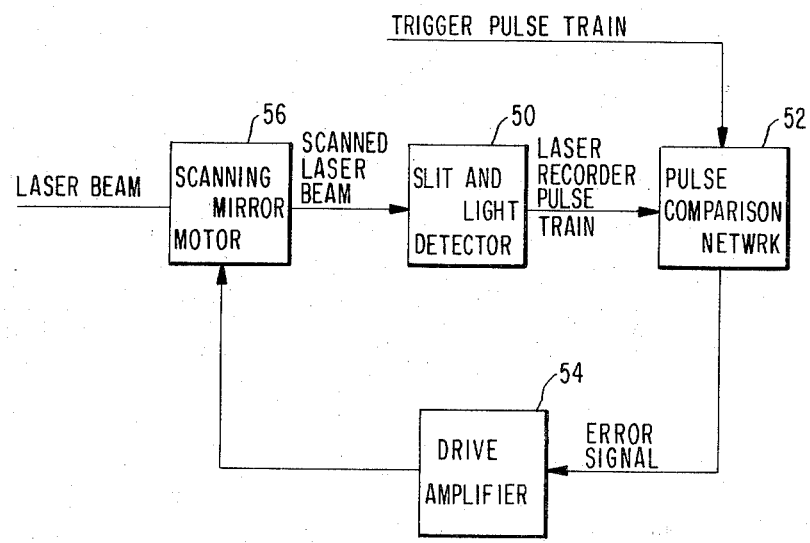
FIG. 4 is a block diagram of a closed loop mirror synchronization system.

A block diagram for a closed loop synchronization system is illustrated in FIG. 4. The position of the mechanically scanned laser beam is monitored by a stationary slit and light detector assembly 50. As each laser beam scans across the slit, an electrical pulse is generated. The pulse train so produced by the laser beam is compared with the radar trigger pulse train by the pulse comparison network 52. This network generates an error signal representing the phase difference between these two pulse trains. The error signal then is amplified in the drive amplifier 54 which is connected to the scanning mirror motor 56 in such a fashion to either advance or retard the rotation rate of the scanning mirror depending upon the magnitude and polarity of the generated error signal. Thus, the loop tends to bring the pulse train produced by the slit and light detector into coincidence with the radar trigger pulse train thereby slaving the mirror rotation to the radar pulse repetition frequency.

Such a closed loop mirror synchronization system, however, places a stringent manufacturing requirement on both the laser recorder components as well as the trigger generation circuits in the radar. In particular, the beveled polygon mirror facets must be manufactured to very close tolerances.

The preferred synchronization method, therefore, is an open-loop, self-synchronous operation. When employing this approach, the pulse train produced by the slit and light detector is used to directly trigger the radar. The optical system thus performs the system trigger generation function and eliminates the need for a corresponding electronic trigger generation circuit. Such an approach assures synchronization between the radar pulses and the rotation rate of the scanning mirror.

The operation of the optical processor will now be discussed. The primary purpose of the optical processor is to compute the Fourier transform or the power spectrum of the Doppler frequency data recorded on the recording film. The moving targets may thereby be discriminated from the ground clutter background. A second function of the optical processor is to improve the range resolution of a chirped radar by compressing the received echoes. As it will be seen, both the spectrum analysis and pulse compression operations are easily performed by a coherent optical system.

Figure 5:
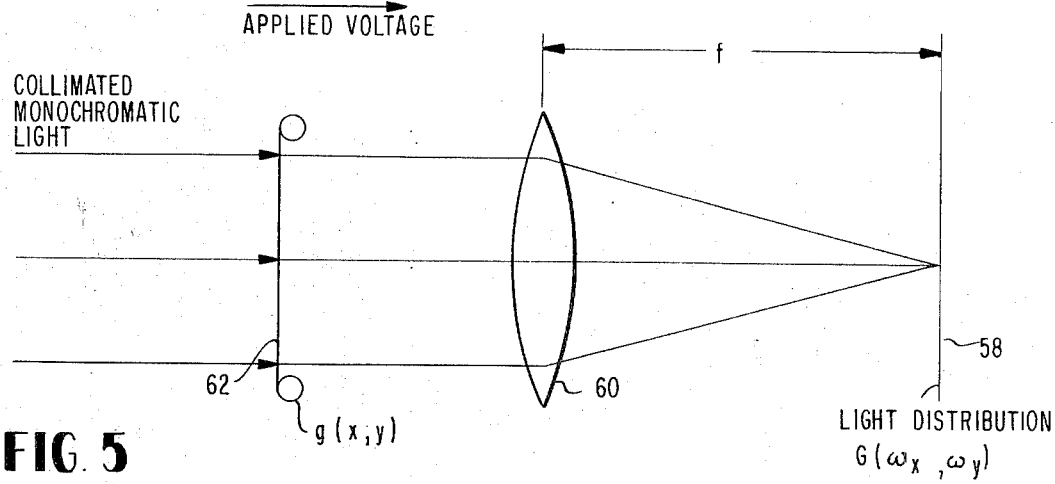
FIG. 5 illustrates the Fourier transforming properties of spherical lenses in coherent light.

Such a spectrum analysis operation is inherent in a coherent optical system as illustrated in FIG. 5. The light amplitude distribution 58 at the back focal length of a coherently illuminated lens 60 is proportional to the two dimensional Fourier transformation of any data written on a film 62. Thus, if a function $g(x,y)$ is recorded on the film the light distribution $G(\omega_x, \omega_y)$ is formed according to the equation:

$$G(\omega_x, \omega_y) \approx \iint g(x, y) e^{\frac{2\pi^1}{\lambda f}(x\omega_x + y\omega_y)} dx dy$$

Such an optical Fourier transform function is discussed in "Principles of Optics," Born and Wolf, Pergamon Press, 1959, Sections 8.3.3 and 8.6.1, and see especially Equation 43 on Page 385. In this reference, the Fourier transform is referred to as the Fraunhofer diffraction pattern.

Figure 6A:
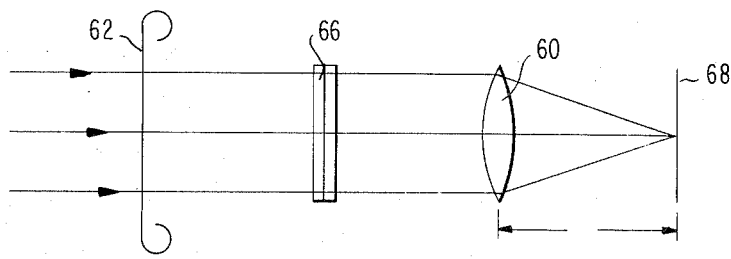
FIGS. 6a and 6b illustrate a lens system producing a one dimensional Fourier transform.
Figure 6B:
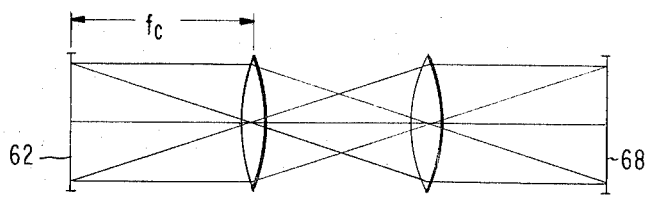

For an AMTI processor, however, only a one dimensional spectrum analysis is required. This reduction to only one dimension is achieved by adding a cylindrical lens as illustrated in FIG. 6. A cylindrical lens 66 is introduced between the film 62 and the spherical lens 60. FIG. 6a illustrates the top view of such a lens system. In this perspective, the cylindrical lens has no power and behaves merely as a block of glass. Thus, the spherical lens 60 images the Fourier transform onto the output screen 68 as discussed above. In the side view, as illustrated in FIG. 6b, however, the cylindrical lens 66 has magnifying power. When it is placed one focal length from the film, horizontal lines recorded on the film are imaged into horizontal lines in the output plane 68. The light variations along each horizontal line in the output plane, however, remain proportional to the power spectrum of the signal on the corresponding horizontal line of the input film. Consequently, the result of adding a cylindrical lens is a channelized or one dimensional spectrum analysis.

Figure 7A:
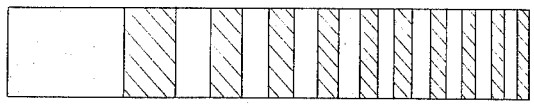
FIGS. 7a and 7b illustrate the focusing properties of a zone plate in coherent light.
Figure 7B:
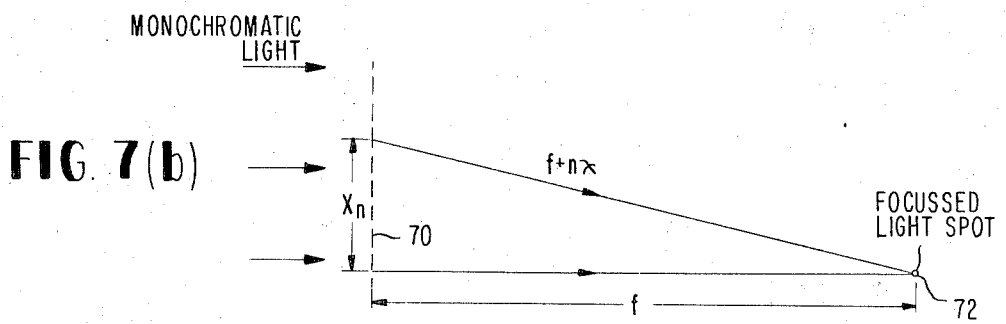

The pulse compression operation is even more fundamental and requires no additional optics. In a chirped radar, the received echo waveforms produce a zone plate pattern on the recording film as illustrated in FIG. 7(a). Such zone plate patterns having focusing properties similar to a lens. A one dimensional zone plate is illustrated in FIG. 7(a); the shaded areas are ideally opaque and the clear areas are transparent. The frequency increases linearly from left to right. It should be noted that the zone plate pattern illustrated is a "square wave" zone plate, that is, the density changes abruptly from one zone plate to the next. In actual radar practice, the modulation would be more nearly sinusoidal with a gradual change from the transparent to an opaque region. A side view of this zone plate placed in a collimated, coherent light beam is illustrated in FIG. 7(b). The light rays passing through the zone plate 70 are defracted so that they focus to a spot 72 as illustrated. The focal length $f$ of a zone plate may be calculated by assuming that the light passing through each zone must add in phase at the focal spot. The path length from the nth zone to the focal spot must therefore differ from the $n-1$ zone by one wavelength of light. From the geometry of FIG. 7(b), this requires that $X_N^2 + f^2 = f^2 + 2n\lambda f + n^2\lambda^2$, and assuming that $N^2\lambda^2$ is very small, this equation may be reduced as:

$$f \approx X_N^2/2N\lambda$$

These zone plates actually generate three beams (undefracted, converging, and diverging) and the processor must block two of these three beams.

Figure 8:
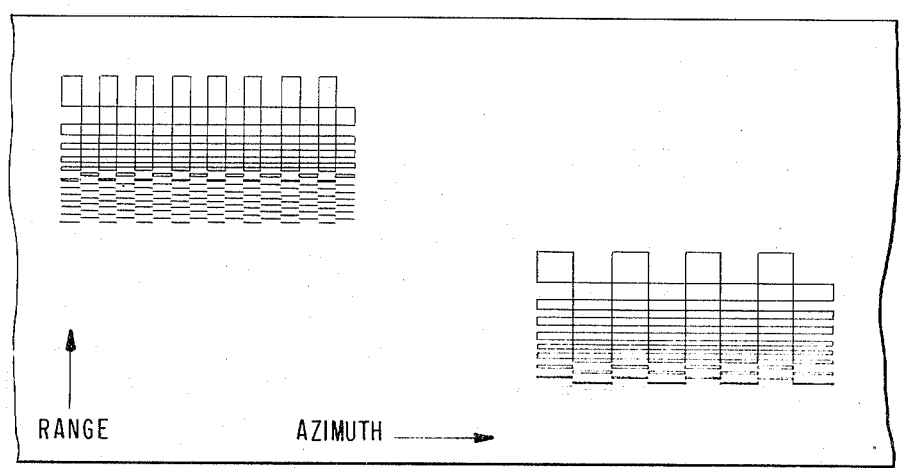
FIG. 8 illustrates an idealized film record of two moving targets as generated by the optical recorder of the present invention.

An idealized representation of an AMTI radar signal film appears in FIG. 8. The record represents the pattern from two point targets without any background clutter. The vertical position of the data is approximately proportional to the range of the targets and the horizontal position is proportional to the azimuth angle of the target. Each pattern has a distinct sinusoidal modulation (shown as a square wave in the figure) in the azimuth direction. The spatial frequency of this pattern is proportional to the Doppler frequency shift produced by each target. Thus the target generating the pattern on the upper left has a higher radial velocity (higher grating frequency) than the other target.

The vertical modulation for each pattern is identical and produces a Fresnel zone plate type of pattern. This pattern results from the linear frequency shift in the transmitted radar pulse of a chirped radar system, thereby allowing the use of a longer pulse with lower peak power required for a given range resolution requirement.

Figure 9A:
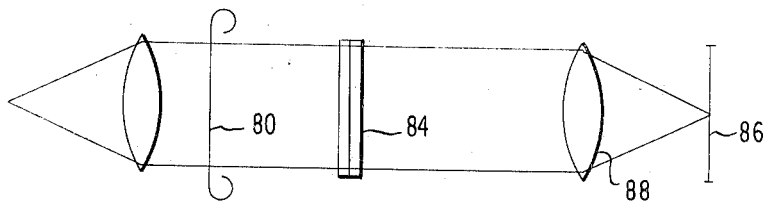
FIGS. 9a and 9b are schematic views of an optical processor employed in the present invention.
Figure 9B:
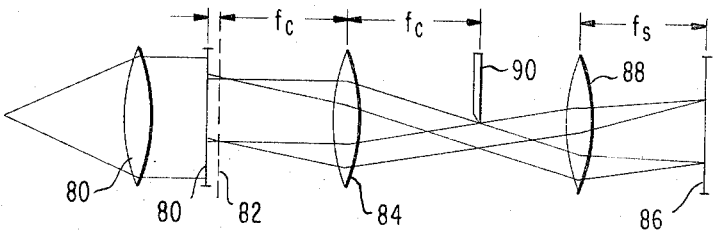

To be detected as targets, the optical processor must convert the patterns illustrated in FIG. 8 into point spots of light. Therefore, it must simultaneously focus the one dimensional zone plates and the one dimensional Doppler grating. The horizontal and vertical lines of the patterns illustrated in FIG. 8 represent the boundaries of alternate opaque and transparent areas. A schematic illustration of an optical processor which achieves these functions is illustrated in FIG. 9. The system is similar to the channelized spectrum analyzer of FIG. 6 with the following exceptions:

1. Since the zone plates on the film 80 focus part of the coherent light energy to a line 82 in front of the film, the front focal length of the cylindrical lens 84 is placed in coincidence with the focal plane 82 of the vertical zone plates. The cylindrical lens, in conjunction with spherical lens 88, images this line to the output plane 86.

2. The separation between the cylindrical lens 84 and the spherical lens 88 is increased. This increased separation does not alter the optics of the system since for a channelized analyzer this distance is arbitrary and is normally minimized. This increased separation allows a DC block 90 to be inserted in the lens system at the back focal length of the cylindrical lens 84. The DC block 90 functions to eliminate the DC virtual images from each zone plate and is effective regardless of the location of the zone plates on the input film.

Figure 10:
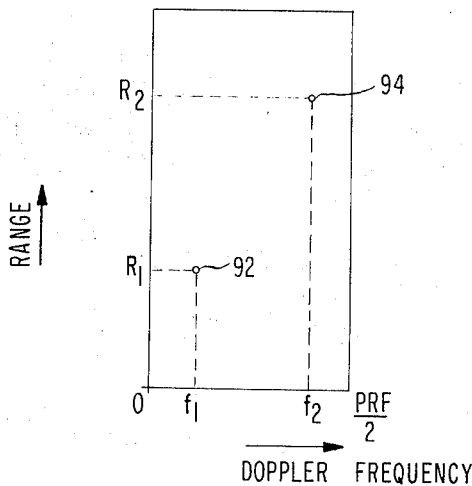
FIG. 10 illustrates an output plane of the optical processor of FIG. 9.

The output from the optical processor is a two dimensional light pattern. For the idealized case of two point targets in the radar field of view wherein the record film resembles that illustrated in FIG. 8, these two target signals would be focused to two distinct points of light in the processor output plane 86, as illustrated in FIG. 10. The vertical displacement of any spot of light indicates the range of the corresponding target and the horizontal displacement of a spot indicates the radial velocity of the target with respect to the radar. Thus, spot 92 represents a target at a near range of R1 and spot 94 indicates a target at range R2. The target indicated by spot 94 is traveling at a faster radial velocity since its horizontal displacement is greater than that of spot 92.

In practice, however, all background clutter reflectors as well as two targets produce a point of light at the output of the processor. The point of light representing targets are therefore distinguished from those representing ground clutter. This is accomplished since the target Doppler frequency shifts differ from the major ground clutter spector and thus occur in a different physical location on the output plane of the processor.

There are several suitable techniques for reading out the processed light intensity distribution as well as eliminating the background clutter at the same time. The most straightforward is to scan the two dimensional output plane with a TV vidicon tube. Assuming the scan lines are horizontal, each video sweep would contain data from only one range interval. Within a single sweep, the independent variable (time) would be proportional to Doppler frequency shifts. Low radial velocity targets would thus occur early in the TV sweep period while faster targets would occur later.

Considering the removal of background clutter, the background clutter for an AMTI radar could occur anywhere in the output plane depending upon the antenna angle of the radar transmitter. Assuming the antenna is pointed at an angle $\theta$ with respect to the ground track, the clutter spectrum would be located at a Doppler frequency given by:

$$f_a = 2Va/\lambda \cos \theta,$$

where $Va$ is the velocity of the radar platform. This method of detection could therefore blank the video pulse (or attenuate it) during the time of occurrence of the clutter spectrum by sensing the position of the radar antenna and thereby eliminating the background. Targets at other Doppler frequencies would pass through the circuit and could modulate a planned position indicator (PPI) display which displays the range of each target as the radial distance from the center of an oscilloscope with the angle being equal to the antenna pointing angle.

For many radar applications, the optical processor generates too much data for the above vidicon type readout. For example, with one hundred lines per millimeter resolution and 5 inch film, over 10,000 range resolution elements would be required. No present vidicon can handle this much data since the very best vidicon/crt displays have less than 4,000 TV lines.

Another method of output detection is to employ an array of light detectors and a rotating mirror to scan the processor output plane. If the scanning mirror rotates in a vertical plane, a narrow horizontal slit, for example, 10 microns, may be used to transmit the recorded data. A fiber optic bundle may be placed in the slit, e.g., the slit could contain 25 fiber optic elements along the horizontal slit. The fiber optic bundle is used to transmit the vertical, closely spaced Doppler frequency shift channels to larger discrete light detectors. Thus, as the mirror rotates in a vertical plane, each light detector intercepts only one Doppler frequency band but sequentially samples every range interval. The output from this type of scanner detector is a set of signals, each signal having a video waveform which varies with time as the radar reflectivity varies with range, each signal containing the energy from only one relatively narrow Doppler frequency band. This method of output detection permits better target discrimination as well as better height finding capability. When employing this type of output detector, the attenuation of the ground clutter may be achieved with various techniques.

A first technique is called preprogrammed clutter attenuation. Basically, this method provides for attenuating those Doppler frequency channels which are known to have a large probability for strong clutter noise because of the angle of the radar antenna. The Doppler frequency shift for any ground reflector is given by:

$$f_c = 2Va/\lambda \cos \theta$$

where
$Va$ = aircraft velocity,
$\lambda$ = radar wavelength, and
$\theta$ = the angle between the aircraft ground track and the ground reflector of interest.

If the radar antenna is pointing at the angle away from the ground track, then most of the clutter energy will be distributed about the frequency $f_c$ as given by the above equation. As the antenna rotates, $\theta$ changes and so does $f_c$, the center frequency of the clutter Doppler spread. Thus, by monitoring the angle of the radar antenna, the channel corresponding to the center frequency $f_c$ may be attenuated, thereby eliminating the background clutter. It should be noted, however, that this technique only applies to AMTI radar since the average clutter frequency from ground based radars is assumed to be zero at all times.

There are several disadvantages to the preprogrammed clutter attenuation technique described above. For example, if the background reflectance decreases, the system continues to block those frequency bands which might have clutter and consequently targets which could be detected are therefore lost. Thus, it would be desirable to have a variable clutter attenuation which adapts to the existing clutter level. Furthermore, if the clutter spectrum shifts (as in sea clutter with a water current changing direction as a function of range), the clutter attenuation frequencies should be shifted accordingly.

One method of achieving such an adaptive clutter attenuation is to adjust the gain setting of each Doppler channel according to a weighted average of the clutter that existed previously in the same channel and possibly in adjacent channels. An integrator circuit could average the clutter over several preceding range intervals, and as the clutter level increases, the gain is decreased. In addition, a threshold circuit could be placed in the Doppler channel which could increase the threshold signal required if the other level increases and vice versa. The sensitivity of a Doppler channel is therefore reduced and the false alarm probability is kept rather low. When the background reflectivity decreases as for sea backgrounds or beyond the horizon echoes, the sensitivity increases and targets which would have been missed are now detected.

In addition, a post processing digital computer may be used to keep track of all moving targets independent of the type of short term clutter attenuation used. The computer could generate a scan-to-scan target tracking and thus remove any false alarms due to stationary discrete clutter echoes which pass through the clutter attenuation circuits. For the airborne case, discrete ground clutter echoes move in the direction of the aircraft ground track. The computer can identify stationary targets by comparing the known aircraft ground velocity with the tracks of all targets. Any targets which have a velocity equal to the ground velocity of the radar are rejected by the computer.

The above descriptions have assumed that the pulse repetition frequency of the radar system is of such a magnitude that range ambiguities are not produced. Range ambiguities arise at higher pulse repetition frequencies since the echoes from far ranges return at the same time as echoes generated by later pulses return from near ranges. At such higher frequencies, the system described above may be easily modified to resolve any range ambiguities.

Figure 11:
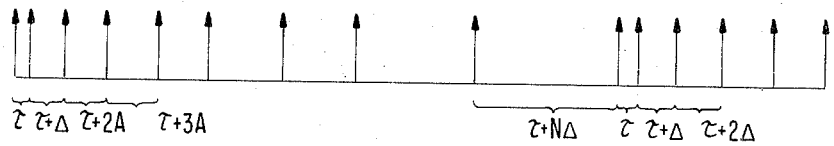
FIG. 11 illustrates the pulse repetition pattern employed to resolve range ambiguities in the subject invention.

The optical recorder optically operates as described above. The only difference occurs in the synchronization of the scanning mirror since the pulse repetition frequency is now varied according to the progression $t$, $t+\Delta$, $t+2\Delta$, . . . $t+n\Delta$, where $t$ is the time spacing between the first and second pulses, $\Delta$ is a fixed time, and $n$ is a predetermined number. The progression is repeated once it has been completed, as illustrated in FIG. 11. The speed and synchronization of the scanning mirror is such that the data from a minimum radar range always falls at the bottom of the recording film while the data from the first ambiguous range always falls at the top of the recording film. The first ambiguous range is defined as that range whose echo will coincide with the echo from the minimum range when it is illuminated by the next pulse. The echo from all farther ranges will be recorded in subsequent sweeps of the scanning mirror.

Figure 12:
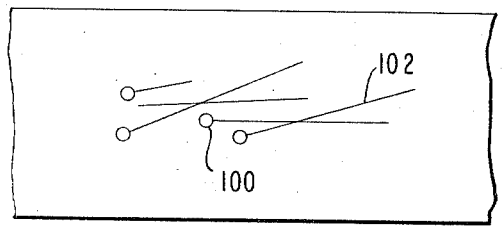
FIG. 12 illustrates a target history format on the record film when employing the pulse repetition pattern illustrated in FIG. 11.

This method of synchronization in confluence with the particular pulse repetition pattern has the unique feature of causing all target histories from targets of a given range ambiguity interval, i.e., all targets between the nth and the $nth + 1$ ambiguous ranges, to fall along lines of a predetermined angle on the record film. Thus, as illustrated in FIG. 12, the data from all targets in the near (unambiguous) range interval fall on horizontal lines, e.g., line 100. The histories of targets in the first ambiguous range interval all fall along lines of slope $\theta$, e.g., line 102. Target histories from the nth interval occur on lines of approximate slope $n\theta$.

To process the radar data so recorded, a multichannel processor is required. Each channel of the processor operates as the single processor described above and is used to process the radar data from only one ambiguous range interval, that is, along a fixed angle of the record film. The processors may be placed in parallel, each observing a slightly different part of the signal film. To achieve processing at the different angles, each processor has a cylindrical lens oriented at a unique angle corresponding to the angle $\theta$ on the film; each processor would therefore integrate targets from only one ambiguous range interval. Since the record film is moving continuously, each processor covers all of the azimuth data on the film.

As in the above single channel processor, some method of detection is required. Preferably, the detection system would also include means for attenuating the background clutter.

While the invention has been particularly shown and described with reference to the preferred embodiments thereof, it will be understood that various changes in form and detail may be made therein without departing from the spirit and scope of the invention.

What is claimed is:

1. In a coherent radar system having means for transmitting radar pulses and receiving radar echoes from said pulses wherein said received echoes represent radar data, a radar processing system for extracting information from said radar data about moving targets in the presence of high background clutter comprising:
   a. optical recording means sensitive to said radar echoes for storing said radar data and comprising:
      1. means for generating an optical beam,
      2. optical modulating means in the path of the optical beam and responsive to the radar echoes for modulating the beam, and
      3. an optical recording medium sensitive to the modulated beam for recording said radar data; and
   b. optical processing means for processing said stored data in such a way to emphasize said moving targets over said background clutter, whereby said moving targets are distinguished from said background clutter, said optical processing means including optical means for producing an optical display of the Fourier transform of the stored radar data.

2. The radar processing system of claim 1 wherein said optical beam is a coherent light beam, and wherein said optical recording means comprises:
   a. driving means for advancing said optical recording medium; and
   b. scanning means for scanning said modulated beam across said recording medium in a direction transverse to its driven direction, whereby said radar data is stored on said optical recording medium.

3. The optical recording means of claim 2 further comprising:
   a. comparator means coupled between the output of said optical modulating means and said received radar echoes for generating an output signal representing the difference between these signals, and
   b. voltage driving means coupled to said optical modulating means and sensitive to said output signal for controlling said optical modulating means whereby the output of said modulating means is linearized.

4. The optical recording means of claim 2 wherein said scanning means comprises a beveled scanning mirror.

5. The optical recording means of claim 2 further comprising:
   a. timing means coupled to said scanning means and said radar pulses for synchronizing said scanning means with said radar pulses, whereby the radar data may be recorded in a predetermined manner on said optical recording medium.

6. The radar processing system of claim 1 wherein:
   a. said radar data is stored in vertical and horizontal directions, the radar data in said vertical direction representing the radar echoes from one radar pulse while traveling from the nearest to the farthest range, and the radar data in the horizontal direction representing similar data from successive radar pulses; and
   b. said optical means produces from said stored data the Fourier spectrum of the Doppler frequency shift in the horizontally stored radar data.

7. The radar processing system of claim 6 wherein said optical processor comprises:
   a. a source of collimated, coherent light for producing a beam of light;
   b. driving means for advancing said stored radar data through said beam of light in a horizontal direction, whereby said radar data modulates said beam;
   c. a lens system placed in said beam after the entry of said radar data for focusing said modulated beam into images; whereby the Doppler shift of said horizontally recorded data determines one directional displacement of said displayed image and said vertically recorded data determines the other directional displacement of said displayed image.

8. The optical processor of claim 7 further comprising detector means for attenuating said images derived from said background clutter.

9. In a coherent radar system having means for transmitting radar pulses and receiving radar echoes from said pulses wherein said received echoes represent radar data, said radar pulses being transmitted at such a frequency that radar echoes from several pulses may be received in the same time interval thereby creating range ambiguities in the radar data as to these echoes, a radar processing system for resolving said range ambiguities comprising:
   a. an optical recorder for storing said radar data, said storage taking place in vertical and horizontal directions, the radar data in said vertical direction representing the radar echoes from one radar pulse while traveling from a minimum radar range to a first ambiguous range, and the radar data in the horizontal direction representing similar data from successive radar pulses;
   b. timing means for varying the time period between successive radar pulses according to the progression $t, t+\Delta, t+2\Delta, \ldots t+n\Delta$, where $t$ is the time between the first and second pulses, $\Delta$ is a fixed time interval, and $n$ is a predetermined number, said progression being repeated once completed, whereby all stored radar data of a given range ambiguity falls along a line at a predetermined angle; and c. a multichannel optical processor for processing said stored data, whereby each channel processes one ambiguous range interval, said optical processor including optical means for producing an optical display of the Fourier transform of the stored radar data.

10. In a coherent radar system having means for transmitting radar pulses and receiving radar echoes from said pulses wherein said received echoes represent radar data, a method for extracting information from said radar data about moving targets in the presence of high background clutter comprising the steps of:

a. optically storing said radar echoes by generating a recording optical beam, modulating the beam in proportion to the received radar echoes, and recording the modulated beam on an optical recording medium; and b. optically processing said optically recorded data in such a way to emphasize said moving targets over said background clutter, whereby said moving targets are distinguished from said background clutter, said processing step including optically producing the Fourier transform of the recorded data.

11. The method of claim 10 wherein the recording beam is a coherent light beam, and wherein said step of optically recording comprises the steps of:

a. advancing the optical recording medium; and b. scanning said modulated recording beam across said recording medium in a direction transverse to its driven direction, whereby said radar data is stored on said optical recording medium.

12. The method of claim 10 wherein said optical processing step comprises the steps of:

a. generating a processing beam of collimated, coherent light;

b. advancing said recorded radar data through said processing beam of light, whereby said recorded radar data modulates said beam;

c. focusing said modulated processing beam into images; and d. optically displaying said images.

13. The method of claim 12 further comprising the step of attenuating those images derived from said background clutter.

* * * * *